Nov. 5, 1957 — C. T. HALL — 2,812,498
AURAL ATTENUATORS
Filed Sept. 23, 1953 — 2 Sheets-Sheet 1

INVENTOR.
Cecil T. Hall.
BY
HIS ATTORNEY

Nov. 5, 1957     C. T. HALL     2,812,498
AURAL ATTENUATORS

Filed Sept. 23, 1953     2 Sheets-Sheet 2

INVENTOR.
Cecil T. Hall.
BY
*a. Williamson*
HIS ATTORNEY

United States Patent Office 2,812,498
Patented Nov. 5, 1957

2,812,498
AURAL ATTENUATORS
Cecil T. Hall, Mount Lebanon, Pa.
Application September 23, 1953, Serial No. 381,921
7 Claims. (Cl. 333—28)

My invention relates to an aural attenuator, and more particularly to an electric loudness control having frequency compensating characteristics in the audio frequency range that closely parallel the characteristics of the average human ear.

The sound pressure frequency characteristics of the human ear have been effectively derived by Fletcher and Munson, and their curves for this action are a standard reference for those skilled in the art. An examination of such curves reveals the need for a bass boost action of the order of 12 decibels (db) an octave and a treble boost action of the order of 6 decibels (db) an octave for low listening levels. Objective and subjective tests indicate that the mid-frequency attenuation of such a control device should be in excess of 50 decibels (db). It is apparent that the problem of devising a control to fulfill these needs is a difficult one and it is increasingly difficult to provide such a device that can be readily manufactured and is inexpensive. The problem is further complicated by the desirability of maintaining conventional input and output impedances and also by the tolerance required by conventional signal energy sources and load devices. Again, it is necessary that the control actions occur simultaneously for changes in the setting of the control means and that they agree or track with accuracy the characteristics of the average human ear.

The Fletcher-Munson curves are loudness contours which reflect the related values of sound pressure level and frequency required to produce a given loudness sensation for the typical listener. The unit of loudness is the Phon which is directly related to the sound pressure characteristics of the ear. For convenience the loudness level in Phons has been made numerically equal to the electrical measuring unit, the decibel (db), at a pure tone frequency of 1000 cycles per second and relative to the same zero reference level which is generally the average threshold of hearing, that is, .0002 dyne per square centimeter.

For the purpose of the present application, it is more convenient to use the decibel as a unit of measurement, in that it directly relates sound pressure level, electric power and the amplitude of voltages. Necessarily, it expresses sound pressure levels in electric power ratios which are equivalent to voltage ratios needed to determine the characteristics of an electrical loudness control.

In view of the foregoing problems, one object of my present invention is to provide a loudness control affording very accurate aural compensation.

Another object of my invention is to provide a loudness control of the type described which is simple in construction and economical to manufacture.

Another object of my invention is to provide a loudness control of the type here involved having safety features which prevent boosting any frequency above the others at maximum setting.

A further object of my invention is to provide a loudness control which compensates in some measure for the low frequency inefficiency of loud speakers.

A still further object of my invention is the provision of a tone control having reduced insertion loss.

Again, an object of my invention is to provide a resistor-capacitor network which is economical in construction, simple to operate and has the ability to satisfy most aural control needs.

Also, an object of my invention is to provide a wide range continuously variable loudness control.

Another object of my invention is the provision of means for low level music reproduction related to the characteristics of the human ear.

A further object of my invention is to provide means which permits full range low level music reproduction.

Other objects, features and advantages of my invention will be apparent from the following specification taken in connection with the accompanying drawings.

Briefly, the foregoing objects, features and advantages of my invention, I obtain by the provision of a novel arrangement of several interconnected networks which include potentiometers, resistors and capacitors. A first one of the potentiometers in series with a resistor and a capacitor serves as a first circuit network, a second one of the potentiometers in series with a second resistor and a second capacitor serves as a second network, and a third network includes another capacitor and portions of each of the first and second potentiometers. The outside terminal of the first potentiometer of the first network serves as an input terminal for signal energy. The other outside terminal of this first network is connected to a common bus connection which serves as the other input terminal for the signal energy as well as one of the output terminals. A movable contact arm of said first network potentiometer is electrically connected to a movable contact arm of the potentiometer of the second network. A terminal of this second network intermediate its potentiometer and resistor is connected directly to a second output terminal, and the outside terminal of the second network adjacent its capacitor is connected to the common bus connection. The other outside terminal of said second network is connected through a third one of the capacitors to the first mentioned terminal of the first network potentiometer.

It is to be understood that the control means embodying the invention is not limited in its form to that outlined above and this form is a preferred one of several that may be used.

I shall describe certain forms of an aural attenuator or loudness control means embodying my invention and shall then point out the novel features thereof in claims.

In the accompanying drawings, Fig. 1 is a diagrammatic view showing one form of circuit networks for a control means embodying my invention.

In each of the different views like reference characters are used to designate similar parts.

Figure 1:
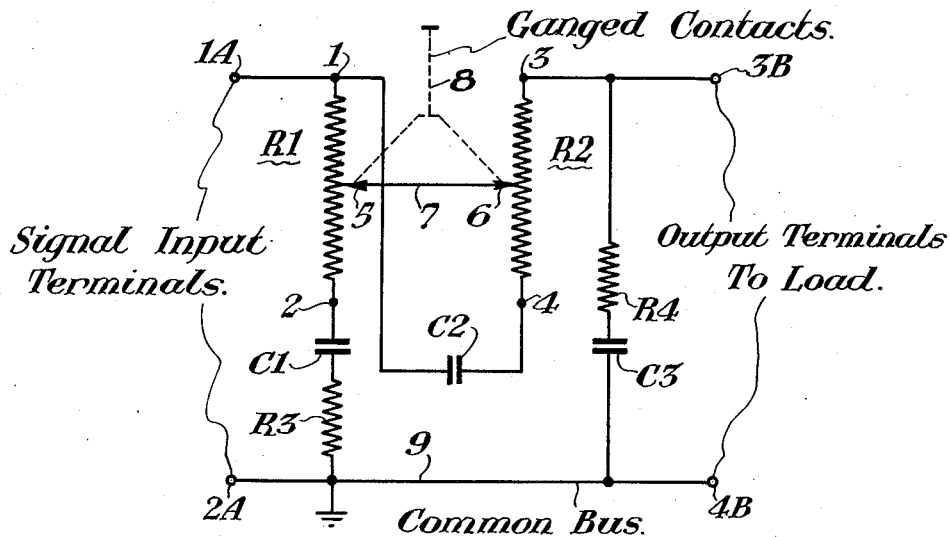

Referring to Fig. 1, the loudness control means of my invention comprises a group of three interconnected resistance-capacitance networks which includes two potentiometers identified as a whole by the reference characters R1 and R2, respectively; three capacitors C1, C2 and C3; and two resistors R3 and R4.

The potentiometers R1 and R2 may be of any one of several known constructions for such devices, these devices being well known to the art. For example, each of these potentiometers may be of the carbon resistance type selected to have a preselected maximum resistance and made with a taper which preferably is linear so that operation of the movable contact member of the potentiometer will produce a preselected change in the results effected by the network in which the potentiometer is included.

The potentiometer R1 has two terminals designated by the reference characters 1 and 2, the terminal 1 being connected directly to a signal input terminal 1A of the control means. The potentiometer R2 is provided with two terminals 3 and 4, the terminal 3 being connected directly to an output terminal 3B of the control means. The potentiometers R1 and R2 are provided with movable contact arms 5 and 6, respectively. Preferably these contact arms 5 and 6 are electrically connected by a conductor 7 and are mechanically connected by a suitable linkage indicated by dotted lines 8 for simultaneous movement between the terminals 1—3 and terminals 2—4 of the potentiometers. This mechanical linkage is indicated conventionally by the dotted lines 8 because mechanical connection for gang operation of two or more electrical contacts is known and the specific connection forms no part of my present invention. In Fig. 1 the maximum loudness positions of the contact arms 5 and 6 are toward the terminals 1 and 3 and their minimum loudness positions are toward the terminals 2 and 4. Furthermore, it has been found that potentiometers with a linear taper; i. e., those that are arranged so that a given fraction of movement of the adjustable contact arm from one end results in a similar fraction of the resistance being included between the contact arm and that end; when thus connected, yield a substantially uniform rate of aural attenuation when employed in my invention. This is the result of the two simultaneous attenuation actions of the ganged potentiometers causing the fractional attenuation of each to be effectively multiplied, as when they are each adjusted to the mid-point of the resistance element, and the effective mid-frequency transmission is one-half times one-half or one quarter.

The second terminal 2 of the potentiometer R1 is connected to a common bus connection 9 through a capacitor C1 and a resistor R3 in series. This common bus 9 is connected to a second input terminal 2A and also to one output terminal 4B of the control means. The first terminal 1 of the potentiometer R1 is connected through a capacitor C2 to the second terminal 4 of the potentiometer R2. The first terminal 3 of the potentiometer R2 is connected to a second output terminal 3B of the control means and to the common bus 9 through a resistor R4 and a capacitor C3 in series. Thus the potentiometer R1 in series with capacitor C1 and resistor R3 forms a first circuit network; the potentiometer R2 in series with resistor R4 and capacitor C3 forms a second network; and the capacitor C2 together with portions of potentiometers R1 and R2 as determined by the setting of contact arms 5 and 6 forms a third network.

To analyze the action of the control means of Fig. 1 it is preferable to first consider the action of each network separately. The network comprising potentiometer R1, capacitor C1 and resistor R3, which I have referred to as a first network, serves to attenuate all audio frequencies applied to input terminals 1A and 2A with reduced attenuation as the frequency falls below a given frequency during movement of the contact arm 5 from its maximum position terminal 1 to its minimum position terminal 2. It can be said that the action of this network for a given degree of attenuation is to impart a low frequency or bass boost to the applied signal energy. This bass boost action for maximum attenuation is of the order of the conventional 6 db an octave. The maximum attenuation is readily determined by the relation of the resistance of potentiometer R1 to resistor R3, and the frequency at which the desired degree of bass boost action occurs at any degree of attenuation is determined by the preselected relation of the impedance of capacitor C1 at this frequency to the impedance of potentiometer R1. Resistor R3 is selected to provide a desired treble boost action when contacts 5 and 6 are at positions 2 and 4 when there is minimum loudness action.

The output signal energy for this first network is taken from contact arm 5 and applied through a conductor 7 to contact arm 6 of the potentiometer R2. As stated above, the potentiometer R2 in series with resistor R4 and capacitor C3 forms a second network. This second network also serves to attenuate the signal energy with a reduced attenuation of low frequencies as the contact arm 6 is moved from its maximum position terminal 3 to its minimum position terminal 4. As the attenuation is increased, the bass boost action of this network increases until at maximum attenuation it approaches the conventional 6 db an octave.

However, as the contact arm 6 moves from its maximum setting to its minimum setting it serves to increase the resistance in the second network due to the increase in the resistance between the point of contact arm 6 and the terminal 3. Thus this second network differs in its action from the first network because the total resistance of the first network remains fixed as the position of the contact arm 5 of potentiometer R1 is varied. It can be said that the first network affords a fixed turn-over point for the low frequency boost, and the second network affords a variable turnover point for low frequency boost. This effect of the second network might be undesirable if it were predominant. However, it is preferable for the parts to be so proportioned as to have the mid-frequency attenuation of the first network greater than the mid-frequency attenuation of the second network, thus reducing the effect of any undesirable characteristic as to the low frequency boost of the second network.

The third circuit network, formed by the portion of potentiometer R1 between the contact arm 5 and the terminal 1 and the portion of potentiometer R2 between the position of contact arm 6 and terminal 4 together with capacitor C2, is a path of decreasing impedance for increasing frequency when the contact arms 5 and 6 are moved from their maximum positions 1—3 toward their minimum positions 2—4. For example, for equal values and tapers of potentiometers R1 and R2 it is apparent that the sum of the resistances shunting the capacitor C2 is equal to the resistance of the potentiometer R1 or that of potentiometer R2, and this resistance is essentially a fixed value for any setting of the ganged contact arms 5 and 6 when potentiometers R1 and R2 are equal as here assumed for illustration. This novel use of the two opposed variable elements permits the potentiometers to be selected so that the turnover point of the low frequency boost remains essentially fixed as well as permitting a gradually increased high frequency boost, to be described shortly, as mid-frequency attenuation is increased. It is apparent that for any positions of the contact arms 5 and 6 other than maximum positions the effect of the impedance of capacitor C2 is to afford a shunt path of decreasing impedance from terminal 1 to terminal 4 as frequency increases. Thus its effect as the contact arms 5 and 6 are moved from terminals 1 and 3 to terminals 2 and 4 is to offer a path of lower impedance to high frequencies than that of the path through the portions of the potentiometers. Hence, it can be said that for any degree of attenuation effected by the control means, this third network provides a high frequency or treble boost action.

To sum up, the composite three networks of my control means disclosed in Fig. 1 achieve five (5) interlocked and simultaneous effects on signal energy applied to input terminals 1A and 2A and which effects are interrelated as the contact members 5 and 6 are moved from their maximum positions. Namely, (1) the signal energy is attenuated by the action of the first network; (2) the low frequencies are boosted or increased in amplitude relative to the other frequencies by the action of the first network; (3) the signal energy is attenuated by the action of the second network; (4) the low frequencies are boosted relative to the other frequencies by the action of the second network; and (5) the high frequencies are boosted or increased in amplitude relative to the other frequencies by the action of the third network.

Figure 2:
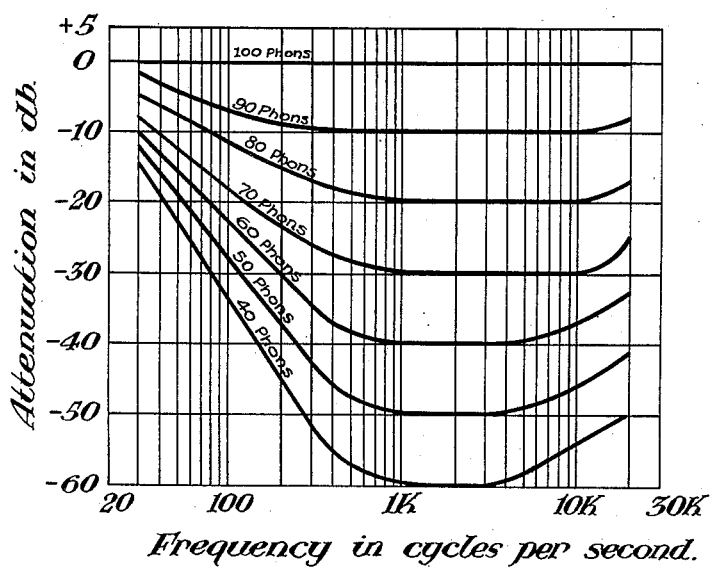
Fig. 2 is a view showing the idealized curves of the amplitude frequency characteristics of the average human ear.

The need for these five simultaneous actions achieved by the control means of Fig. 1 can best be understood by an examination of the idealized curves, as shown in Fig. 2, for the frequency amplitude characteristics of the average human ear.

For attenuation of mid-frequencies of 40 db or more from an arbitrary level that approximately corresponds to the reproduction level of the original program it is apparent from these curves that the need bass boost action approaches 12 db an octave. It is known that simple resistance-capacitance networks are limited to boost action approaching 6 db an octave and also that when such networks are employed with variable elements to produce variable attenuation with attendant bass boost action there is a practical limitation to the amount of such action that can be achieved. Both these considerations point to the need of two such networks in a system designed to fit the characteristics shown by these curves. That is, in Fig. 1, the first and second networks enable a total of approximately 12 db an octave low frequency boost to be achieved as a result of their combined effects. Also these two networks achieve a maximum mid-frequency attenuation that is essentially the product of their respective attenuations.

The curves of Fig. 2 show that for attenuation of the order of 60 db at 1000 cycles per second there is required attenuation of the order of 15 db at 30 cycles per second, or a bass boost action of the order of 45 db for 60 db, mid-frequency attenuation. Such action involves a voltage ratio at 30 cycles per second of over 100 times that at 1000 cycles per second. From this it is apparent that considerable complexity and increased expense would result in a device attempting to achieve this bass boost action by independent bass control action, in that it would necessarily involve an insertion loss of 45 db, or an increased voltage gain requirement of over 100 times. It follows that the control means disclosed in Fig. 1 has decided advantages because the desired bass boost action is obtained without increased insertion losses.

Furthermore, it is evident from the curves of Fig. 2 that the treble boost action for any degree of attenuation is of a relatively small order and it is readily met by a simple RC network. It should be pointed out, however, that the normal 6 db an octave curve for treble boost is too great for maximum attenuations of 50 db or less and its full effect is better suited to the curves for maximum attenuation of 60 db or more. Since it is not practical to achieve simultaneous maximum attenuation of 60 db or more and the attendant bass boost action required from the action of a single resistance-capacitance (RC) network, it is an additional reason for the use of two attenuation networks with the treble boost action of a simple RC network interconnected with the other networks. Hence it is to be seen from these curves and a knowledge of the characteristics of resistance-capacitance (RC) networks that it is helpful in obtaining the results here sought to provide an arrangement using interrelated multiple RC networks.

It is also evident from the curves of Fig. 2 that there is a slight shift in treble turnover point toward the lower frequencies as attenuation is increased. This condition can be readily achieved in my control means of Fig. 1 by increasing the value of the resistance of potentiometer R1 with respect to the resistance of potentiometer R2. When thus constructed the capacitor C2 has an increasing resistive shunt as attenuation is increased and it can be made to shift the treble boost turnover point in the manner shown in the curves. This effect could also be used to arbitrarily increase the total treble effect by lowering the frequency turnover point and thus increase the boost of the higher frequencies.

In systems having inherent treble attenuation as from Miller effect, etc., this arrangement of my control is useful in offsetting this attenuation and compensating for the inefficiency of some loud speakers at high frequencies. It is to be pointed out that this treble boost or additional treble effects as one or both of the contact arms are varied from the maximum positions can be obtained by other modifications of my control means. For example, a capacitor shunted across potentiometer R1 or R2 or a portion of either, would afford varied high frequency boost actions relative to mid-frequency attenuation. In Fig. 1 I have disclosed the embodiment that I have found offers the best results.

Again, if it is desirable to adjust the treble response to a greater or lesser extent than achieved by the normal operation of my control means of Fig. 1, the capacitor C2 may be made a variable capacitor, or other means may be provided for varying the amount of capacitance included in the third circuit network of which capacitor C2 forms a part. When it is desirable to limit the low frequency boost action of my invention to some arbitrary frequency so as to limit the transmission of low frequency noise, etc., the capacitor C1 or C3 or both may be shunted by a suitable limiting resistor or the output terminals 3B and 4B may be shunted by a suitable resistive load. For example, the potentiometer R6 in Fig. 4, to be referred to shortly, may be selected to limit the low frequency boost action of the network R4—C3. The manner of determination of proper values of resistance for such limitation is well known in the art as is other means of alteration of the apparatus embodying my invention to achieve some specific effect.

By way of illustration only, and not in any sense by way of limitation, the following values when applied to the parts disclosed in Fig. 1 provide the results noted hereinbefore for this embodiment of my invention.

| | |
|---|---|
| Potentiometer R1 | 2 megohms. |
| Potentiometer R2 | 1 megohm. |
| Resistor R3 | 20,000 ohms. |
| Resistor R4 | 100,000 ohms. |
| Capacitor C1 | .0075 microfarad. |
| Capacitor C2 | .00002 microfarad. |
| Capacitor C3 | .0015 microfarad. |

From the curves of Fig. 2 of the drawings it is evident that the most convenient reference point for a device, such as I have provided, which is linear for all audio frequencies at maximum output, is the 100 Phons curve (top curve in Fig. 2) and which curve reflects the similar linearity of the human ear at that loudness level. This is also convenient in that such a loudness level roughly corresponds to the original level of reproduction of most music. Then on the basis of such a reference point, the values shown above employed in my invention, as shown in Fig. 1, permit a maximum mid-frequency attenuation of approximately 60 db which corresponds to a loudness level of 40 Phons (bottom curve in Fig. 2) and which curve is well below the loudness of average conversation and corresponds to a minimum loudness normally employed for music reproduction.

Figure 3:
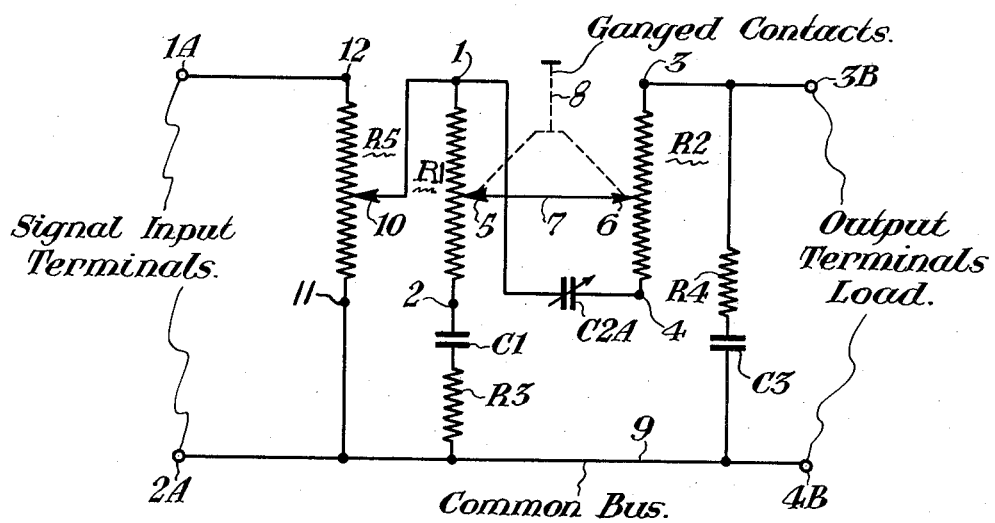
Fig. 3 is a diagrammatic view showing another form of circuit networks for a control means embodying the invention.

Referring to Fig. 3, the control means is similar to that disclosed in Fig. 1 except the capacitor C2 of Fig. 1 is made a variable capacitor C2A in Fig. 3, and a potentiometer R5 having terminals 11 and 12 and a contact arm 10 is inserted between the input terminals 1A and 2A and the input of the potentiometer R1 as will be apparent from an inspection of the drawing.

The potentiometer R5 serves as an additional level control without frequency compensation and in some applications of the invention it is advantageous when the original program level applied to the input terminals 1A and 2A is apt to vary over a relatively wide range. Another unexpected advantage of the use of the potentiometer R5 in the manner disclosed in Fig. 3 is that for any selected loudness level below maximum, increasing R5 and reducing the loudness control has the effect of increasing the bass response primarily; and decreasing R5 and increasing the loudness control has the effect of reducing the bass response primarily. It is clear therefore that the control means of Fig. 3 is operative to provide the control effected by the form of control means in Fig. 1 plus the control obtained through the potentiometer R5.

Figure 4:
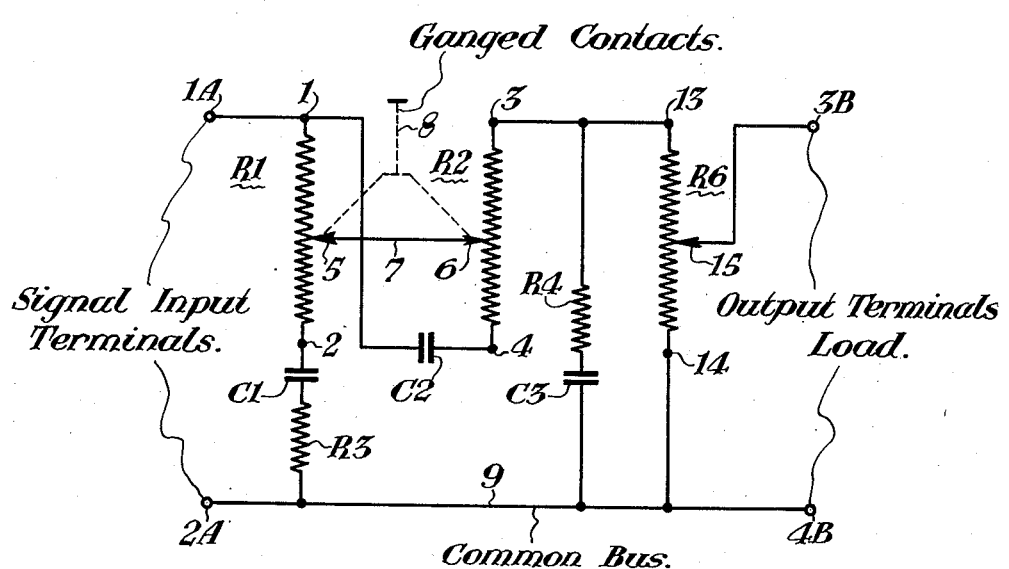
Fig. 4 is a diagrammatic view showing another form of control means that I may use and also embodying the invention.

In Fig. 4 the control means is similar to that of Fig. 1 except a potentiometer R6 having terminals 13 and 14 and a movable contact 15 is inserted between the output of the second circuit network and the output terminals 3B and 4B. I have found that in some applications the form disclosed in Fig. 4 has advantages.

Prior to my invention most frequency compensating means included in audio devices have limitations in the source impedance of the device furnishing the input energy to them or to the load impedance of the device deriving output energy from them. My invention affords a wide tolerance in design in this respect in that all elements may be selected at low relative impedance when a low impedance source is available, or may be selected at high relative impedance for a medium impedance source. When designed for a low impedance source the load impedance may be relatively low without serious effects on the action of the system. In fact the grid circuit of a triode amplifier with Miller Effect may be employed as a load, in that the output impedance of my invention is limited at higher audio frequencies by the value of resistor R4 in the form shown in Fig. 1, for example, and which may be determined with proper design to afford minimum loss of high frequencies due to shunt capacitance such as Miller Effect in a triode amplifier.

When a volume or level control is employed in connection with my invention, it may be introduced into the input circuit where it becomes a factor in the source impedance or it may be employed in the output circuit where it largely determines the load impedance. In either case the wide latitude afforded by my invention in selecting the impedance of the various components permits design for standard values of control when used in either position with a minimum effect on the action of my invention.

It is to be seen from the foregoing description of the control means embodying the invention, that it is simple in construction and includes parts which are economical to manufacture and readily operated. Also it requires small space and can be fitted into a control panel readily. Furthermore, it provides a loudness control affording accurate aural compensation. Also it provides a bass boost and a treble boost action which closely agree with the characteristics of the human ear. Again, at its maximum setting, all frequencies are substantially linear. It is evident that from the operating characteristics of the control means inefficiencies of loud-speakers can be compensated, and tone control is effected without insertion loss.

Although I have herein shown and described but three forms of aural attenuators embodying my invention, it is understood that various changes and modifications may be made therein within the scope of the appended claims without departing from the spirit and scope of my invention.

Having thus described an aural attenuator or loudness control means embodying my invention, what I claim is:

1. In a loudness control means having a pair of input terminals to which a source of electrical energy of the audio frequency range may be connected and a pair of output terminals to which an audio frequency responsive load may be connected, the combination comprising; a first, a second and a third circuit network; each said first and second networks including a potentiometer, a resistor and a capacitor in series, each said potentiometer having a movable contact arm, said first network connected across said input terminals, said second network having an outside terminal and a point intermediate its potentiometer and resistor connected across said output terminals, an electrical conductor connected between said movable contact arms for said second network to receive the audio frequency energy from said first network, and said third network formed by a capacitor connected across outside terminals of said first and second networks to include in the third network a portion of each of said potentiometers, whereby each said first and second networks variably attenuates the high frequencies of audio frequency energy to a greater extent than the low frequencies and the third network variably reduces the attenuation of the high frequencies.

2. In an aural attenuator having a pair of input terminals to which signal energy can be applied and a pair of output terminals to which a load circuit can be connected, one input and an output terminal having a common bus connection, the combination comprising, a first and a second circuit network, each said network including a potentiometer, a resistor and a capacitor in series; each said potentiometer having a movable contact member, an electrical connection between the movable contact members of said potentiometers to connect the output of said first network to the input of said second network, said first circuit network having one outside terminal connected to the noncommon bus input terminal of the attenuator and its other outside terminal connected to the input terminal having the common bus connection, said second circuit network having one outside terminal connected to the output terminal having the common bus connection and a point between its potentiometer and resistance connected to the noncommon bus output terminal, and another capacitor connected between an outside terminal of the potentiometer of said first circuit network and a second outside terminal of the potentiometer of said second circuit network.

3. In a loudness control the combination comprising, a first and a second potentiometer each having a first and a second outside terminal and a movable contact operable between the outside terminals, said two movable contacts mechanically connected for movement in unison, an electrical conductor connecting said two movable contacts, a first and a second resistor; a first, a second and a third capacitor; said first outside terminal of said first potentiometer connected to a first input terminal, said second outside terminal of said first potentiometer in series with said first resistor and said first capacitor connected to a second input terminal, said first outside terminal of said second potentiometer connected to a first output terminal, said second resistor and said second capacitor in series connected between said first outside terminal of said second potentiometer and a second outside terminal, a common bus connected between said second input terminal and said second output terminal, and said third capacitor connected between said first outside terminal of said first potentiometer and said second outside terminal of said second potentiometer.

4. In a loudness control unit for use with electric energy of the audio frequency spectrum the combination comprising; a first input terminal, an input-output terminal, a second output terminal, and a first, a second and a third circuit network; said first network formed by a series combination of the total resistive impedance of a potentiometer, the capacitive impedance of a first fixed capacitor and the resistive impedance of a first fixed resistor; said first input terminal being electrically connected to the free terminal of said potentiometer and said input-output terminal being electrically connected to the free terminal of said first fixed resistor; said second network formed by the series combination of the variable resistive impedance of a variable resistor, the resistive impedance of a second fixed resistor and the capacitive impedance of a second fixed capacitor, the movable arm of said variable resistor being electrically connected to the movable arm of said potentiometer, said third network formed by the parallel combination of the capacitive impedance of a third fixed capacitor in shunt with the series combination of the resistive impedance of the portion of said potentiometer between said first input terminal and said movable arm of the potentiometer, the resistive impedance of the unused portion of said variable resistor and said electrical connection between the movable arms, said input-output terminal having electrical connection to the free terminal of said second fixed capacitor, and said second output terminal having electrical connection to the junction of said variable resistor with said second fixed resistor.

5. In a loudness control for audio frequency electrical energy the combination comprising, a potentiometer, a variable resistor, a first and second capacitor, a first and second resistor, an input terminal, an input-output terminal and a second output terminal; said input terminal connected to one end terminal of said potentiometer, said first resistor and said first capacitor connected in series between the other end terminal of said potentiometer and said input-output terminal to form a potentiometer type attenuator with bass boost action; said variable resistor connected between the contact arm of said potentiometer and said second output terminal, said second resistor and said second capacitor connected in series between the junction of said variable resistor and said second output terminal and said input-output terminal to form a variable resistor type of attenuator with bass boost action, and common means for mechanically operating the contact arm of said potentiometer and the adjustable element of said variable resistor.

6. In an attenuator for audio frequency voltages with aural characteristics, the combination comprising, an input terminal, a common terminal, an output terminal, a potentiometer, a variable resistor, a first and a second bass boost network each of said networks comprising a resistor and a capacitor in series, said potentiometer having one end terminal connected to said input terminal and the other end terminal connected to a terminal of said first network, the other terminal of said first network connected to said common terminal, said variable resistor having one terminal connected to the arm of said potentiometer and the other terminal connected to said output terminal, said second network connected between said output terminal and said common terminal, and common means for mechanically operating said arm of said potentiometer and the adjustable element of said variable resistor to produce varying degrees of attenuation of said audio frequency voltages with aural characteristics.

7. In a loudness control for audio frequency electrical energy the combination comprising, a first and second potentiometer, a first and a second network each comprising a resistor and capacitor in series to afford an increasing impedance to lower audio frequencies, an input terminal, a common terminal, and an output terminal, said input terminal connected to one end terminal of said first potentiometer, the other end terminal of said first potentiometer connected to one terminal of said first network, the other terminal of said first network connected to said common terminal, the movable contacts of said first and second potentiometers connected to each other, one end terminal of said second potentiometer connected to said output terminal, said second network connected between said output terminal and said common terminal, and common means for mechanically varying the arms of said first and second potentiometers.

References Cited in the file of this patent
UNITED STATES PATENTS

| | | |
|---|---|---|
| 1,864,527 | Castuer | June 28, 1932 |
| 2,069,853 | Schade | Feb. 9, 1937 |
| 2,238,023 | Klipsch | Apr. 8, 1941 |
| 2,322,558 | Bachman | June 27, 1943 |
| 2,484,052 | Rose | Oct. 11, 1949 |
| 2,500,493 | Holst | Mar. 14, 1950 |
| 2,680,231 | Reed | June 1, 1954 |